No. 833,278.
PATENTED OCT. 16, 1906.
M. W. ABTS.
LAWN WEEDER.
APPLICATION FILED DEC. 21, 1905.
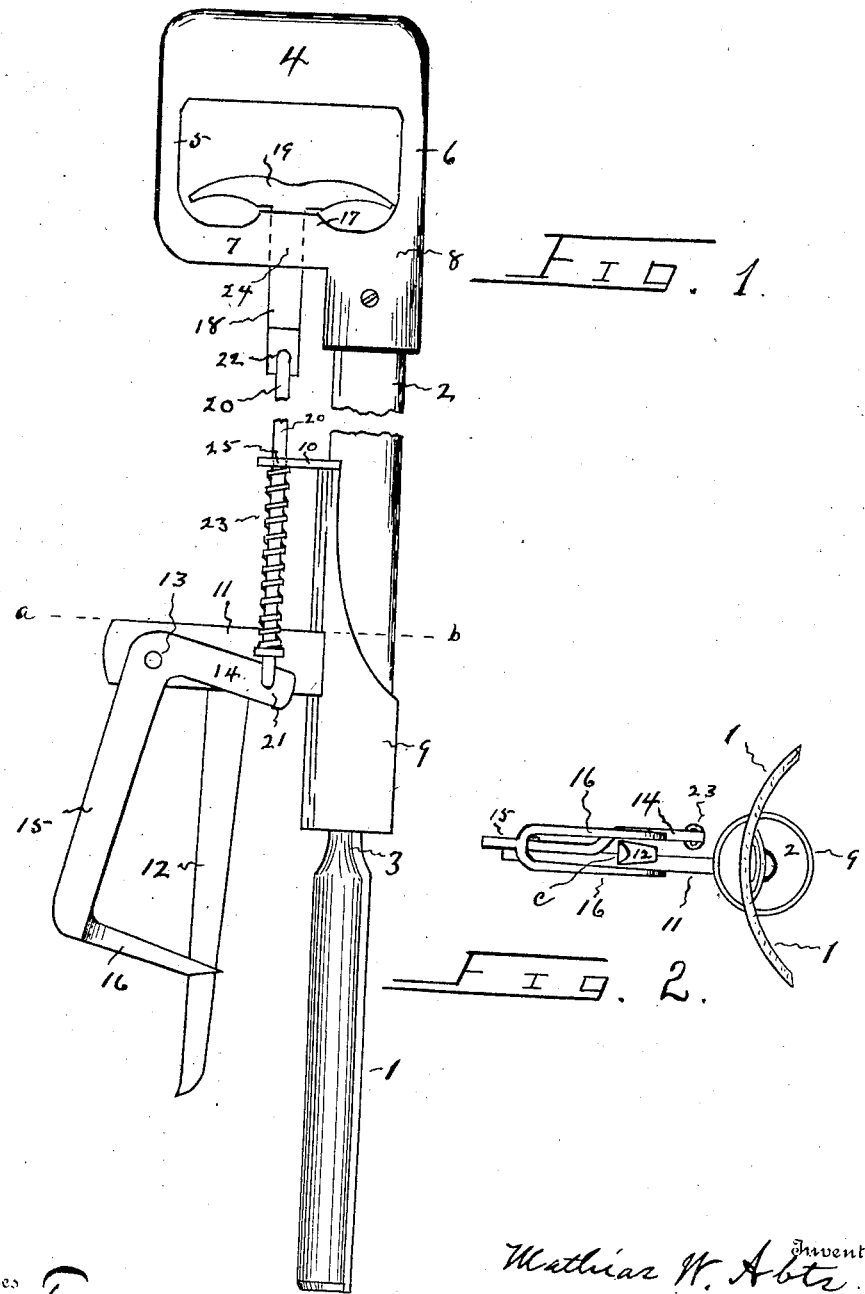

UNITED STATES PATENT OFFICE.

MATHIAS W. ABTS, OF MADISON, NEBRASKA, ASSIGNOR OF ONE-HALF TO CARL HORST, OF MADISON, NEBRASKA.

LAWN-WEEDER.

No. 833,278.      Specification of Letters Patent.      Patented Oct. 16, 1906.

Application filed December 21, 1905. Serial No. 292,690.

*To all whom it may concern:*

Be it known that I, MATHIAS W. ABTS, a citizen of the United States, residing at Madison, in the county of Madison and State of Nebraska, have invented certain new and useful Improvements in Lawn-Weeders, of which the following is a specification.

My invention relates to improvements in lawn-weeders; and my object is to provide an instrument which is simple in construction and of comparative small expense and effective in operation for the removal of weeds from a lawn without disfiguring the appearance of the lawn-surface and without injury to the sod; also, to provide a means by which to detach the weed-root at a point as far beneath the surface as possible, and to provide means for handling the weed in its removal without making manual contact with the weed, and to avoid any necessity on the part of the operator of stooping over while causing a removal of the weed from the ground, and which will be portable and easily handled in effecting this purpose.

With these objects in view my invention presents a novel construction and arrangement of parts, as disclosed herein and as illustrated by the drawings, wherein—

Figure 1 represents a vertical side view of my invention, showing a slight perspective. Fig. 2 represents an inverted plan view of the parts below line $a\ b$ in Fig. 1 to illustrate formation of the claws 16 and curvature of the blade 1.

I mount a blade portion 1 upon the lower end of the shaft 2 by sinking the shank 3 of the blade within the shaft, so that the connection will be firm and rigid, and I construct the handle 4, having the arms 5 and 6, and the platform 7 all as integral parts, which terminate in the collar 8, the latter inclosing the upper end of the shaft 2, and the implement thus far described is practically similar in size to a common garden spade or shovel.

Upon the lower end of the shaft 2 I rigidly mount the sleeve 9, the lower body of which completely incloses the shaft and sustains the shank 3, the sleeve passing upward and partially cut away, so as to inclose a less surface of the staff-body, and terminates in the angular shelf 10. About midway between its shelf 10 and its lower end and extending angularly from the sleeve is the foot-rail 11, preferably constructed integral with the sleeve, and integral with and projecting downward from the rail is the bearing-rod 12, and pivotally hung at 13 upon the rail 11 is an elbow-lever having the arms 14 and 15. Upon the lower end of the arm 15 I construct the claws 16, substantially parallel with each other and which are adapted to pass one on each side of the bearing-rod 12.

The platform has a raised central portion 17, provided with a vertical opening 24 therethrough to accommodate the sliding rod 18, mounted therein, and above the platform I construct integrally and transversely upon the rod 18 the curved holding-piece 19. The holding-piece 19 is conveniently shaped so that the operator may control its movement with the fingers of the same hand which controls the handle 4, and I employ a connecting-rod 20, pivotally mounted upon the end of the lever-arm 14 at 21. The connecting-rod 20 passes through a suitable opening 25 of the shelf 10 and has a pivotal mounting at 22 upon the sliding rod 18, and I employ the coiled spring 23 and mount it upon the connecting-rod 20 to occupy the space between the shelf 10 and the lever-arm 14. As thus constructed the opening 24 of the platform and opening 25 of the shelf and the opening upon the lever-arm 14, which provides for the pivotal bearing of the connecting-rod at 21, are in practical alinement, and the connecting-rod 20 is free to move upward or downward from operation of the holding-piece 19, subject to the resilient action of the spring 23, and a lateral movement or swing of the claws 16 may be accomplished very readily by digital manipulation of the holding-piece 19, as is evident.

The blade 1 extends substantially straight downward from the shaft 2 and is of a sufficient length, practically, to reach the end of almost any growing weed. The blade is preferably constructed with concavo-convex walls, the convex wall being presented to the bearing-rod 12. The bearing-rod 12 is mounted upon the rail 11, adjacent to the sleeve 9, a sufficient lateral distance so that it will interfere as little as possible with the standing weed to be removed, and I construct the bearing-rod 12 preferably with its body and point bayonet-shaped, with the flat wall $c$ thereof presented to the lever-arm 15, and I mount the bearing-rod upon the rail 11, so that its body extends generally parallel with but gradually receding from the blade 1.

The normal position of the claws 16 with reference to the bearing-rod 12 is such that the space between the rod 12 and the blade 1 is practically clear, the claws being drawn back under operation of the elbow-lever and the spring 23, and to operate my invention the blade 1 is sunk into the ground closely adjacent to the weed to be removed, so that the weed is between the blade 1 and the rod 12, and a slight swinging movement is made of the staff 2, which tends to loosen the root of the weed. The claws 16 are then thrown against or in the direction of the blade 1 by the operator while raising the sliding rod 18, as already described. It is intended that the claws 16 will come upon each side of the weed-body and catch under the outspreading leaves of the weed, and it can then be easily raised from the lawn-surface without defacing or injuring the sod.

Several minor details of construction may be varied without departing from the scope of the invention.

What I claim as my invention is—

1. A lawn-weeder, in combination, comprising a handle and a blade portion connected therewith, a lever and a connecting-rod, a downwardly-extending bearing-rod adjacently and rigidly positioned with respect to the blade portion; claws mounted upon the lever and adapted to be thrown, one upon each side of the bearing-rod, in the direction of the blade portion by a lengthwise movement of the connecting-rod.

2. A lawn-weeder, in combination, comprising a handle part and a blade portion connected therewith, a lever and a resiliently-mounted connecting-rod, a downwardly-extending bearing-rod adjacently and rigidly positioned with respect to the blade portion; claws mounted upon the lever and adapted to be thrown, one upon each side of the bearing-rod, in the direction of the blade portion by a lengthwise movement of the resiliently-mounted connecting-rod.

3. A lawn-weeder, in combination, comprising a handle part and a blade portion connected therewith, a lever, a holding-piece and a connecting-rod; a downwardly-extending bearing-rod adjacently and rigidly positioned with respect to the blade portion; claws mounted upon the lever and adapted to be thrown, one upon each side of the bearing-rod, in the direction of the blade portion by a lengthwise movement of the connecting-rod; said holding-piece being attached to said connecting-rod and adapted to control its lengthwise movement.

4. A lawn-weeder, in combination, comprising a handle part and a blade portion connected therewith, a lever, a holding-piece and a resiliently-mounted connecting-rod; a downwardly-extending bearing-rod adjacently and rigidly positioned with respect to the blade portion; claws mounted upon the lever and adapted to be thrown, one upon each side of the bearing-rod, in the direction of the blade portion by a lengthwise movement of the resiliently-mounted connecting-rod; said holding-piece being attached to said resiliently-mounted connecting-rod and adapted to control its lengthwise movement.

In testimony whereof I have affixed my signature in presence of two witnesses.

MATHIAS W. ABTS.

Witnesses:
   JOHN MILLS,
   V. G. LAFLEUR.